3,488,421
TERPENIC ESTERS OF GLUCOCORTICOIDS
Silvano Casadio, Milan, Italy, assignor to Istituto de Angeli S.p.A., Milan, Italy, an Italian body corporate
No Drawing. Filed July 6, 1967, Ser. No. 651,371
Claims priority, application Great Britain, July 15, 1966, 31,936/66
Int. Cl. A61k *17/06;* C07c *169/34*
U.S. Cl. 424—243                                9 Claims

ABSTRACT OF THE DISCLOSURE

There are disclosed pregnane compounds having a keto group in the 3- and 20-positions, a double bond between the 4- and 5-carbon atoms, a keto or β-hydroxy group in the 11-position, and a hydroxy group in the 17-position, which compounds are characterized by the presence of a 21-acyloxy group in which the acyl radical is derived from a terpenic acid, a homoterpenic acid or a terpenylacetic acid, the acid in each case being derived from an acyclic mono-, sesqui- or di-terpene having from 1 to 4 (3-methyl-buten-2-yl) units. These compounds have anti-inflammatory action as in the case of the parent steroids, but with improved therapeutic properties.

---

This invention relates to 21-esters of anti-inflammatory steroids.

It is well known that certain steroidal compounds have valuable anti-inflammatory actions. Such compounds in general are compounds of the pregnane series having certain substituents or groupings which are necessary for anti-inflammatory action. Examples of such substituents or groupings are as follows:

A keto group in the 3- and 20-positions, a double bond in the 4-position, a keto or β-hydroxy group in the 11-position, a hydroxy group in the 17α-position and preferably a hydroxy group in the 21-position. The oxygen function at the 11-position may be replaced by a halogen atom, particularly a chlorine atom, if the 9-position also bears a halogen atom, particularly a chlorine atom. In addition to these generally essential substituents or groupings, the molecule may be further modified and thus many compounds have been proposed having additional substituents or groupings for the purpose of modifying or improving the action of the compounds. Of such modifications those of principal importance include the addition of a double band in the 1-position and the addition of a halogen substituent, particularly fluorine, in the 9α-position both of which steps give rise to substantial increases in anti-inflammatory action. The inclusion of an alkyl group in the 16-position (in either the α- or β-configuration) is also of considerable importance serving inter alia to reduce the mineralo-corticoid activity of the compounds. Other modifications which have been made include the addition of alkyl groups e.g. methyl groups in the 2- or 6-positions; the addition of halogen, especially fluorine, in the 6-position; and the addition of a hydroxy, methylene or fluoromethyl group or a fluorine atom in the 16-position.

It is also well known that various functional derivatives of anti-inflammatory steroids may be used in therapy, such derivatives being compounds the groups of which essential for activity are modified to biologically equivalent groups. Such modifications include, for example, the conversion of the keto group in the 3-position to an enol ether. Such biologically equivalent groups are generally believed to be converted to the active groups following administration to the body. The term "anti-inflammatory steriods of the pregnane series" is used herein to include compounds the groups of which essential for activity have been modified to biologically equivalent groups.

The present invention is based upon the discovery that certain 21-esters of anti-inflammatory steroids of the pregnane series having a 21-hydroxy group having improved therapeutic properties, at least in part due to a reduction in some of the well known undesirable side effects of the compounds. In particular the new compounds are generally more active, upon topical application, than are the parent compounds when used at an equivalent dose. The 21-esters according to the invention are esters having a 21-acyloxy group derived from a mono-, sesqui- or di-terpenic acid containing from 10 to 22 carbon atoms.

Particularly preferred terpenic acids are those corresponding to mono-, sesqui- or di-terpene alcohols, and therefore possessing 10, 15 or 20 carbon atoms e.g. geranic, citronellic or farnesic acid, as well as such acids possessing either one or two further carbon atoms, e.g. homogeranic, geranylacetic, homofarnesic or farnesylacetic acid.

The 21-esthers according to the invention are preferably 21-esters of anti-inflammatory steroids of the pregnane series containing an oxo group in at least the 3- and 20-positions, a hydroxy group in each of the 17- and 21-positions, and an oxo or hydroxy group in the 11-position, and which may also for example contain a further hydroxy or methyl group in the 16-position and/or a fluorine atom in the 6- or 9-position and/or a $\Delta^1$-double bond. The preferred 21-esters may be represented by the general formula

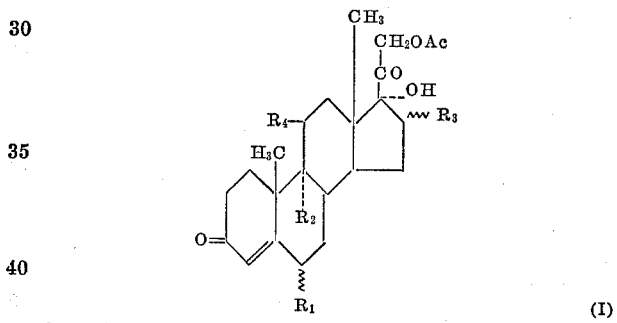

in which $R_1$ and $R_2$ each represents a hydrogen or fluorine atom; $R_3$ represents a hydrogen atom or a hydroxy or methyl group; $R_4$ represents an oxo or hydroxy group; Ac represents the radical of a mono-, sesqui- or di-terpenic acid containing from 10 to 22 carbon atoms; and there is an optional double bond in the 1-position.

Examples of anti-inflammatory steroids of the pregnane series having a 21-hydroxy group which may be esterified at the 21-position to form compounds according to the present invention include cortisone, hydrocortisone, prednisone, prednisolone, dexamethasone, triamcinolone, paramethasone and betamethasone.

A particularly preferred compound according to the present invention by virtue of its especially valuable pharmacological properties is prednisolone 21-farnesyl-acetate. As compared with prednisolone acetate, prednisolone 21-farnesylacetate has similar anti-inflammatory activity coupled however with a higher anti-anaphylacetic activity (demonstrated by an anti-hypothermia activity test on mice in which an anaphylacetic shock has been induced), a lower ulceration-inducing activity (demonstrated by examination of the stomach of the rats treated with the two compounds under examination), a higher topical anti-inflammatory activity (demonstrated by the test of the tetrahydrofurfuryl alcohol induced erithema on guinea-pigs), and a reduced tendency to inhibit the cicatrization of wounds (demonstrated by tests on experimental wounds on rats). Prednisolone 21-farnesylacetate may thus be advantageously used for topical application also when there are slight losses of tissue. The low ulceration-inducing action of prednisolone 21-farnesylacetate is of significance particularly where oral or parenteral administration of the compound is concerned.

According to a further feature of the present invention, there is provided a process for the preparation of the 21-esters according to the invention which comprises reacting an anti-inflammatory steroid of the pregnane series having a 21-hydroxy group with a reactive derivative of a mono-, sesqui- or di-terpenic acid containing from 10 to 22 carbon atoms such as for example an acid halide or anhydride.

In a particularly advantageous process according to the invention the anti-inflammatory steroid is reacted at room temperature, if necessary with external cooling, with an acid halide (preferably the acid chloride) or the anhydride of the terpenic acid, in the presence of an acid binding agent and an organic solvent. Suitable acid binding agents include for example tertiary organic bases e.g. pyridine, quinoline and triethylamine. Suitable organic solvents include diethyl ether and dioxan; alternatively an excess of a tertiary organic base used as acid binding agent may provide the solvent and in this event the preferred tertiary organic base is pyridine. The reaction is preferably carried out under substantially anhydrous conditions and in an inert atmosphere which may for example be provided by nitrogen.

The 21-esters of this invention are generally colourless solids insoluble in water and more or less readily soluble in the common organic solvents. It will be appreciated that when the acyl terpenic radical at the 21-position contains as asymmetric double bond the compounds may exist in both the cis and transforms and in the form of mixtures thereof, all of which forms are within the scope of the present invention.

The invention still further provides pharmaceutical compositions comprising as active ingredient at least one 21-ester according to the invention as hereinbefore defined in association with a pharmaceutical carrier or excipient. The compositions may be in liquid or solid form for oral, parenteral or rectal administration or for topical application. The compositions for oral, parenteral or rectal administration are conveniently formulated as dosage units, each dosage unit preferably containing from 1 to 50 mg. and advantageously from 5 to 10 mg. of active ingredient. Examples of solid formulations for oral administration include tablets, dragees and capsules. Examples of carriers or excipients for these formulations include starch, talc, lactose and additional suitable excipients.

Examples of liquid formulations for parenteral administration include castor oil and propylene glycol solutions in 1 or 2 ml. vials.

For rectal administration the 21-esters may be formulated in suppositories with conventional excipients.

The pharmaceutical compositions for topical application may include a 21-ester according to the invention alone as active ingredient or in association with other pharmacologically active substances such as antibiotics, antibacterial agents and/or cicatrizing compounds. The 21-esters are preferably present in such compositions at a concentration between 0.1 and 3%, and advantageously between 0.5 and 1%, by weight. Examples of suitable compositions for topical application include lipo- and water-soluble ointments, emulsions, lotions, oily eye drops and ear drops.

For the better understanding of the invention the following examples are given by way of illustration only:

Example 1

39.6 g. (0.14 mole) of farnesylacetyl chloride (obtained from natural nerolidol according to P. Dietrich and E. Lederer—Helv. Chim. Acta., 35, 1148 (1952) and subsequent reaction of the acid with $SOCl_2$) are slowly added, with stirring and under nitrogen atmosphere, to a solution of 36.04 (0.1 mole) of prednisolone in 140 ml. of anhydrous pyridine. During the addition the temperature is maintained at about 10° C. by external cooling. The reaction mixture is stirred for 20 hours at room temperature under nitrogen atmosphere, then 400 ml. of anhydrous ether are added and the pyridine hydrochloride is separated by filtration. The ethereal solution is washed with water, with 1% NaOH, with 2% HCl and lastly with water until neutrality is reached. After drying over magnesium sulphate, the ether is distilled off and the doughy residue is triturated with ether.

The prednisolone 21-farnesylacetate is thus obtained as a colourless solid, M.P. 103–105° C. $R_f$ 0.43.

By analogous processes to that described above the following compounds have also been obtained:

Cortisone 21-farnesylacetate: M.P., 70–72° C.; $R_f$, 0.44
Hydrocortisone 21-farnesylacetate: M.P., 65–67° C.; $R_f$, 0.64
Dexamethasone 21-farnesylacetate: M.P., 70–72° C.; $R_f$, 0.46
Prednisolone 21-geranate: M.P., 77–78° C.; $R_f$, 0.40
Prednisolone 21-geranylacetate: M.P., 109–111° C.; $R_f$, 0.37
Prednisolone 21-homofarnesate: M.P., 91–93° C.; $R_f$, 0.41
Triamcinolone 21-geranylacetate: M.P., 99–100° C.; $R_f$, 0.28

Example 2

7.17 g. (0.02 mole) of prednisone, in 40 ml. of anhydrous pyridine, are reacted with 7.92 g. (0.028 mole) of farnesylacetyl chloride as described in Example 1 and the residue thus obtained is crystallized from ligroin. The prednisone 21-farnesylacetate is obtained as a colourless solid, M.P. 103–104° C. $R_f$ 0.42.

By an analogous process, prednisolone 21-citronellate, M.P. 173–174° C., $R_f$ 0.37, has also been obtained.

Example 3

3.06 g. (0.006 mole) of farnesylacetic anhydride are added, under nitrogen atmosphere, to a solution of 1.08 g. (0.003 mole) of prednisolone, in 4 ml. of anhydrous pyridine. The reaction mixture is stirred at room temperature overnight and is then diluted with ether. The ethereal solution is washed with 1% NaOH and finally with water. By working up as described in Example 1, the prednisolone 21-farnesylacetate is then obtained, M.P. 103–105° C.

Example 4.—Tablets

| | Mg. |
|---|---|
| Prednisolone 21-farnesylacetate | 5–7 |
| Lactose | 30 |
| Talc | 3 |
| Magnesium stearate | 2 |
| Starch, q.s. to 100. | |

Example 5.—Suppositories

| | Mg. |
|---|---|
| Prednisolone 21-farnesylacetate | 10 |
| Cocoa butter, q.s. | |

Example 6.—Vials (1) Prednisolone 21-farnesylacetate _____ mg__ 5
    n-Propylene glycol _____ ml__ q.s. to 1
(2) Prednisolone 21-farnesylacetate _____ mg__ 10
    Castor oil _____ ml__ q.s. to 2

Example 7.—Water-soluble ointments

| | Percent |
|---|---|
| Prednisolone 21-farnesylacetate | 0.5–1.0 |
| Polyethylene glycol and preserving agents, q.s. to 100. | |

Example 8.—Lipo-soluble ointments

| | Percent |
|---|---|
| (1) Prednisolone 21-farnesylacetate | 0.5–1.0 |
|     Vaseline oil | 12.0 |
|     n-Propylene glycol | 5.0 |
|     White vaseline and preserving agents, q.s. to 100. | |

Example 8.—Continued

|   | Percent |
|---|---|
| (2) Prednisolone 21-farnesylacetate | 0.5–1.0 |
| Neomycin sulphate 0.5%; or oxytetracycline hydrochloride, 0.5% and tetracycline, 0.5%; or 2-(N-pyrrolidino-ethyl)-β-(1-naphthyl) - acrylate decylbromide, 0.1%. | |
| Vaseline oil | 12.0 |
| n-Propylene glycol | 5.0 |
| White vaseline and preserving agents, q.s. to 100. | |

Example 9.—Creams (emulsions)

|   | Percent |
|---|---|
| Prednisolone 21-farnesylacetate | 0.5–1.0 |
| Pantothenyl trifarnesylacetate | 1.0 |
| Neomycin sulphate, 0.5% or benzalconium, hydrochloride, 0.05%. | |
| Cetylstearyl alcohol | 10 |
| Isopropyl myristate | 10 |
| Polyglycol ether of cetylstearyl alcohol | 5 |
| Demineralized water and preserving agents, q.s. to 100. | |

Example 10.—Lotions

|   | Percent |
|---|---|
| Prednisolone 21-farnesylacetate | 0.5–1.0 |
| Wool fat alcohols | 2.50 |
| Ethoxylated derivatives of lanoline | 1.0 |
| Cetyl alcohol | 0.5 |
| Sorbitan sesquioleate | 2.0 |
| Sorbitan monostearate | 0.5 |
| Polyoxyethylene sorbitan monostearate | 0.5 |
| Water and preserving agents, q.s. to 100. | |

Example 11.—Oily eye drops

|   | Percent |
|---|---|
| Prednisolone 21-farnesylacetate | 0.5–1.0 |
| Oleic acid polyoxyethylene glycerides | 10.0 |
| Preserving agents and peanut oil, q.s. to 100. | |

Ear drops—nasal drops

|   | Percent |
|---|---|
| (1) Prednisolene 1-farnesylacetate | 0.5–1.0 |
| n-Propylene glycol | 5.0 |
| Preserving agents and peanut oil q.s. to 100. | |
| (2) Prednisolone 21-farnesylacetate | 0.5–1.0 |
| Pantothenyl trifarnesylacetate | 1.0 |
| Neomycin palmitate | 0.5 |
| n-Propylene glycol | 5.0 |
| Preserving agents and peanut oil q.s. to 100. | |

I claim:

1. A pregnane compound having a keto group in the 3- and 20-positions, a double bond between the 4- and 5-carbon atoms, a keto or β-hydroxy group in the 11-position, a hydroxy group in the 17-position and characterized by the presence of a 21-acyloxy group in which the acyl radical is derived from a terpenic acid, a homoterpenic acid or a terpenylacetic acid, said acid in each case being derived from an acylic mono-, sesqui- or di-terpene having from 1 to 4 (3-methyl-buten-2-yl) units.

2. A pregnane compound as claimed in claim 1 further characterized by the presence of a double bond between the 1- and 2-carbon atoms.

3. A compound of the formula

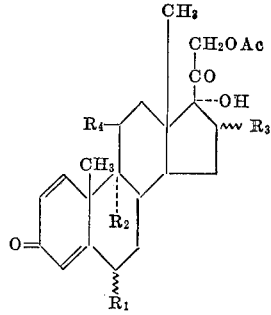

in which $R_1$ and $R_2$ each represent a hydrogen or fluorine atom; $R_3$ represents a hydrogen atom or a hydroxy or methyl group; $R_4$ represents an oxo or hydroxy group; Ac represents an acyl radical derived from a terpenic acid, a homoterpenic acid or a terpenylacetic acid, said acid in each case being derived from an acyclic mono-, sesqui- or di-terpene having from 1 to 4 (3-methyl-buten-2-yl) units; and the broken line between the 1- and 2-carbon atoms represents a single or a double bond.

4. A compound as claimed in claim 3 which is a 21-ester of cortisone, hydrocortisone, prednisone, prednisolone, dexamethasone, triamcinolone, paramethasone or betamethasone.

5. A compound as claimed in claim 3 in which Ac is an acyl radical derived from geranic, homogeranic, geranylacetic, citronellic, farnesic, homofarnesic or farnesylacetic acid.

6. Prednisolone 21-farnesylacetate.

7. A pharmaceutical composition comprising as active ingredient at least one compound as claimed in claim 1 in association with a pharmaceutical carrier or excipient.

8. A composition as claimed in claim 7 in dosage unit form and containing 1 to 50 mg. of active ingredient per dosage unit.

9. A method of treating inflammatory conditions which comprises administering to the patient one or more compounds as claimed in claim 1.

References Cited

FOREIGN PATENTS 965,9236   8/1964   Great Britain.

ELBERT L. ROBERTS, Primary Examiner

U.S. Cl. X.R.

260—397.45

PO-1050
(5/69)

UNITED STATES PATENT OFFICE
CERTIFICATE OF CORRECTION

Patent No. 3,488,421　　　　　　Dated　January 6, 1970

Inventor(s) SILVANO CASADIO

It is certified that error appears in the above-identified patent and that said Letters Patent are hereby corrected as shown below:

Column 2, line 60
　"anti-anaphylacetic" should read "anti-anaphylactic".

Column 2, line 62
　"anaphylacetic" should read "anaphylactic".

Column 4, line 17
　"0.64" should read "0.46".

Column 5, line 40
　"Prednisolene" should read "prednisolone".

SIGNED AND
SEALED
AUG 25 1970

(SEAL)
Attest:

Edward M. Fletcher, Jr.
Attesting Officer

WILLIAM E. SCHUYLER, JR.
Commissioner of Patents